United States Patent [19]
Gunther et al.

[11] Patent Number: 5,781,783
[45] Date of Patent: Jul. 14, 1998

[54] METHOD AND APPARATUS FOR DYNAMICALLY ADJUSTING THE POWER CONSUMPTION OF A CIRCUIT BLOCK WITHIN AN INTEGRATED CIRCUIT

[75] Inventors: Stephen H. Gunther, Folsom; Stanley J. Domen, Roseville; Dileep R. Idate, Folsom, all of Calif.

[73] Assignee: Intel Corporation, Santa Clara, Calif.

[21] Appl. No.: 672,544

[22] Filed: Jun. 28, 1996

[51] Int. Cl.$^6$ .................................................. G06F 1/32
[52] U.S. Cl. .................. 395/750.03; 395/750.01; 395/750.04; 364/707; 364/492
[58] Field of Search ............... 395/750, 750.03, 395/750.05, 750.01, 750.04; 364/707, 492, 483; 365/226, 227; 307/31

[56] References Cited

U.S. PATENT DOCUMENTS

| | | | |
|---|---|---|---|
| 5,167,024 | 11/1992 | Smith et al. | 395/375 |
| 5,237,684 | 8/1993 | Record et al. | 395/682 |
| 5,339,445 | 8/1994 | Gasztonyi | 395/750 |
| 5,390,350 | 2/1995 | Chung et al. | 395/750 |
| 5,392,437 | 2/1995 | Matter et al. | 395/750 |
| 5,473,572 | 12/1995 | Margeson, III | 365/227 |
| 5,495,617 | 2/1996 | Yamada | 395/750 |
| 5,542,035 | 7/1996 | Kikinis et al. | 395/750 |
| 5,634,131 | 5/1997 | Matter et al. | 395/750 |
| 5,640,573 | 6/1997 | Gephardt et al. | 395/750 |

*Primary Examiner*—Gopal C. Ray
*Attorney, Agent, or Firm*—Blakely, Sokoloff, Taylor & Zafman

[57] ABSTRACT

A method of dynamically adjusting the power consumption of a circuit block within an integrated circuit includes the step of incrementing a count total maintained by a counter on the occurrence of a first type of trigger event. The occurrence of a predetermined event is detected when the count total maintained by the counter equals, or transcends, a predetermined threshold value. The predetermined event provides a speculative indication of a future state of activity of the circuit block by reason of a predicted proximity of the predetermined event to the future state of activity of the circuit block. The power consumption of the circuit block is adjusted in response to the occurrence of the predetermined event.

29 Claims, 7 Drawing Sheets

METHOD AND APPARATUS FOR DYNAMICALLY ADJUSTING THE POWER CONSUMPTION OF A CIRCUIT BLOCK WITHIN AN INTEGRATED CIRCUIT

FIELD OF THE INVENTION

The present invention pertains to the field of power management within integrated circuits. More particularly, the present invention relates to a power management mechanism for adjusting the power consumption of a circuit block, such as a cache, within an integrated circuit.

BACKGROUND OF THE INVENTION

The increasing importance of, and demand for, mobile computing capabilities in portable electronic devices have presented a number of challenges for designers and manufacturers of components for use in mobile electronic equipment. These challenges include reducing the size, weight, and power consumption of these electronic components, and increasing the efficiency thereof.

Power-consumption characteristics of mobile electronic devices are particularly important as such devices have self-contained power sources, such as batteries, which power the electronic devices when not connected to an external power source. In furtherance of the goals of reduced size and extended operation of portable electronic devices, it is highly desirable that the electronic components thereof be as power-efficient as possible. This allows smaller and lighter batteries to be incorporated into a device, without sacrificing operational time under power from such a battery. The portable computing and cellular telephone markets have emerged as two arenas in which particular importance has been attached to the power-consumption characteristics of components.

It is also desirable to reduce power consumption in non-mobile electronic devices, such as desktop computers, for a number of reasons. For example, the reduction in power consumption by a central processing unit (CPU) within a desktop computer may serve to extend the operational life of the CPU.

A number of prior art methods and apparatus have been proposed to achieve improved power consumption in portable electronic devices. One such prior art method is disclosed in U.S. Pat. No. 5,167,024 (Smith et al.) to Apple Computer, Inc. of Cupertino, Calif., (referred to herein as the '024 patent). This patent discloses a power management chip which is coupled to receive a "sleep" command from a central processing unit (CPU) of a computer system when the CPU determines that there has been no computer user activity for a certain amount of time. The power management chip then, in response to the "sleep" command from the CPU, will send the entire computer into an inactive mode of reduced power consumption. While the apparatus and methodology disclosed in the '024 patent are effective in reducing the power consumed by the computer system during periods in which a user does not utilize a computer or when battery power is low, insufficient resolution or granularity with respect to monitoring capability is provided to achieve optimum power reduction. Furthermore, the apparatus disclosed in the '024 patent merely responds to the occurrence of two events, namely a low battery level and computer user inactivity. As such, this apparatus does not allow a performance/power consumption tradeoff to be dynamically adjusted and optimized, depending on the state of the computer, or an application being executed by the computer system. The apparatus disclosed in the '024 patent also requires the CPU of a computer system to monitor the peripheral devices, and to determine when these peripheral devices should be de-activated. The apparatus disclosed in the '024 patent may furthermore be undesirable in certain mobile computing applications, such as cellular telephones, as the power management chip is external to the various devices which it monitors, and thus may result in increasing the volume and bulk of the portable device.

It is known in the prior art to reduce the power consumption of an integrated circuit, such as a microprocessor, by gating a distributed clock signal to a specific logic or functional unit which is not currently performing useful work within the microprocessor. Clock gating has proved to be particularly effective to reduce power consumption within a microprocessor, as between 25 and 50 percent of power consumption by the integrated circuit can be attributed to activity of the clock signal.

An important consideration in prior art implementations of clock gating to circuit blocks within an integrated circuit has been the trade-off of performance against reduced power consumption. More specifically, once a clock signal to a circuit block has been gated, there is an inherent latency, or time delay, before the distributed clock signal is again supplied to the relevant circuit block. This latency is a result of the time required to detect that activation of the relevant circuit block is required and to generate an enabling signal, as well as the inherent switching delay caused by the clock gating mechanism.

As a result of this latency in the supply of a clock signal to a functional circuit block which has been deactivated, prior art methods and apparatus of gating clock signals to circuit blocks within an integrated circuit were limited to gating clock signals to those circuits whose activation could be determined with absolute certainty, and with a sufficient lead time that the latency discussed above resulted in no performance losses. An example of such an apparatus and methodology is disclosed in U.S. Pat. No. 5,392,437 (Matter et al.) to Intel Corporation of Santa Clara, Calif., the assignee of the present application (referred to herein as the '437 patent). More specifically, the '437 patent discloses a method and apparatus for powering down a function unit, such as a floating point unit within an integrated circuit, when the floating point unit is not currently executing a floating point instruction, or is not going to execute a floating point instruction in the near future. Whether or not the floating point unit is going to execute a floating point instruction in the near future can be determined with absolute certainty, and with adequate lead time, by the microcode unit and the decoder unit of the microprocessor. Thus, according to the methodology disclosed in the '437 patent, the microcode and decoder units are able to identify whether or not a floating point instruction will be presented to the floating point execution unit with sufficient lead time so as to allow the floating point unit to be deactivated and then again activated sufficiently early so as to prevent a performance penalty.

There are, however, numerous circuit blocks, or functional units, within a microprocessor for which it is impossible to determine with absolute certainty whether activation of the relevant circuit block will be required in the near future. Accordingly, sufficient lead time within which to power-up a de-activated device so as to prevent a performance loss cannot be guaranteed. Consequently, designers of integrated circuits have been reluctant to enable the powering down of such circuit blocks, in view of expected performance penalties. Nonetheless, these circuit blocks, depending on the application being executed by the microprocessor, may experience extensive idle periods. The potential exists for a significant reduction in power consumption by the microprocessor during such circuit block idle periods.

In summary, integrated circuit (IC) designers have traditionally viewed power reduction with an all-or-nothing approach. Where performance considerations have been paramount, IC designers have been unwilling to implement power consumption reduction features within an IC unless, once a specific circuit block was powered down, power management circuitry could provide sufficient and absolutely certain notice of future activity so as to allow the circuit block to be powered up prior to the future activity so as to avoid a performance loss. Where power consumption considerations have been paramount, IC designers have followed the approach of always reducing the power consumption of a circuit block after activity, and then tolerating the performance penalties required to power-up the circuit block each time the circuit block is again required to function.

The present invention seeks to address these shortcomings of the prior art, with a method and apparatus for dynamically exploiting the underutilized potential for power reduction that is presented by the idle periods of circuit blocks of the type discussed above.

SUMMARY OF THE INVENTION

According to a first aspect of the invention there is provided a method of dynamically adjusting the power consumption of a circuit block, such as level two cache memory or an execution unit, within an integrated circuit. The method requires the detection of the occurrence of a predetermined event within the integrated circuit, the predetermined event providing a speculative indication of future activity or inactivity of the circuit block by reason of a predicted proximity of the predetermined event to the future activity or inactivity by the circuit block. For example, the occurrence of a first number of level one cache memory hits provides a speculative indication of future inactivity of the level two cache memory. The occurence of a second number of level one cache memory hits may provide a speculative indication of future activity of the level two cache memory. The method then requires adjustment of the power consumption of the circuit block in response to the occurrence of the predetermined event. The detection of the predetermined event may require incrementing a count total maintained by a counter on the occurrence of a first type of trigger event, and then detecting the occurrence of the predetermined event when the count total maintained by the counter equals, or transcends, a predetermined threshold value. The first type of trigger event may be a clock cycle for which the circuit block is inactive.

In another embodiment the circuit block may be a level two cache memory and the first type of trigger event may be a level one cache memory hit. In a further embodiment, the circuit block may be a page walk handler and the first type of trigger event may be a translation lookaside buffer hit. In yet another embodiment, the circuit block may be a bus interface unit coupled to a bus, and the first type of trigger event may be a bus access.

According to a second aspect of the invention there is provided apparatus for dynamically adjusting the power consumption of a circuit block within an integrated circuit. The apparatus has means for detecting the occurrence of a predetermined event within the integrated circuit, the predetermined event providing a speculative indication of future activity or inactivity of the circuit block by reason of a predicted proximity of the predetermined event to the future activity or inactivity by the circuit block. The apparatus also has means for adjusting the power consumption of the circuit block in response to the occurrence of the predetermined event. The means for detecting the occurrence of the predetermined event includes a counter configured to maintain a count of a first type of trigger event, and circuitry adapted to detect the occurrence of the predetermined event by detecting when the count of the first type of trigger event maintained by the counter is equal to, or transcends, a predetermined threshold value.

BRIEF DESCRIPTION OF THE DRAWINGS

The present invention is illustrated by way of example in the figures of the accompanying drawings, in which like references indicate similar elements and in which.

DETAILED DESCRIPTION

Figure 1:
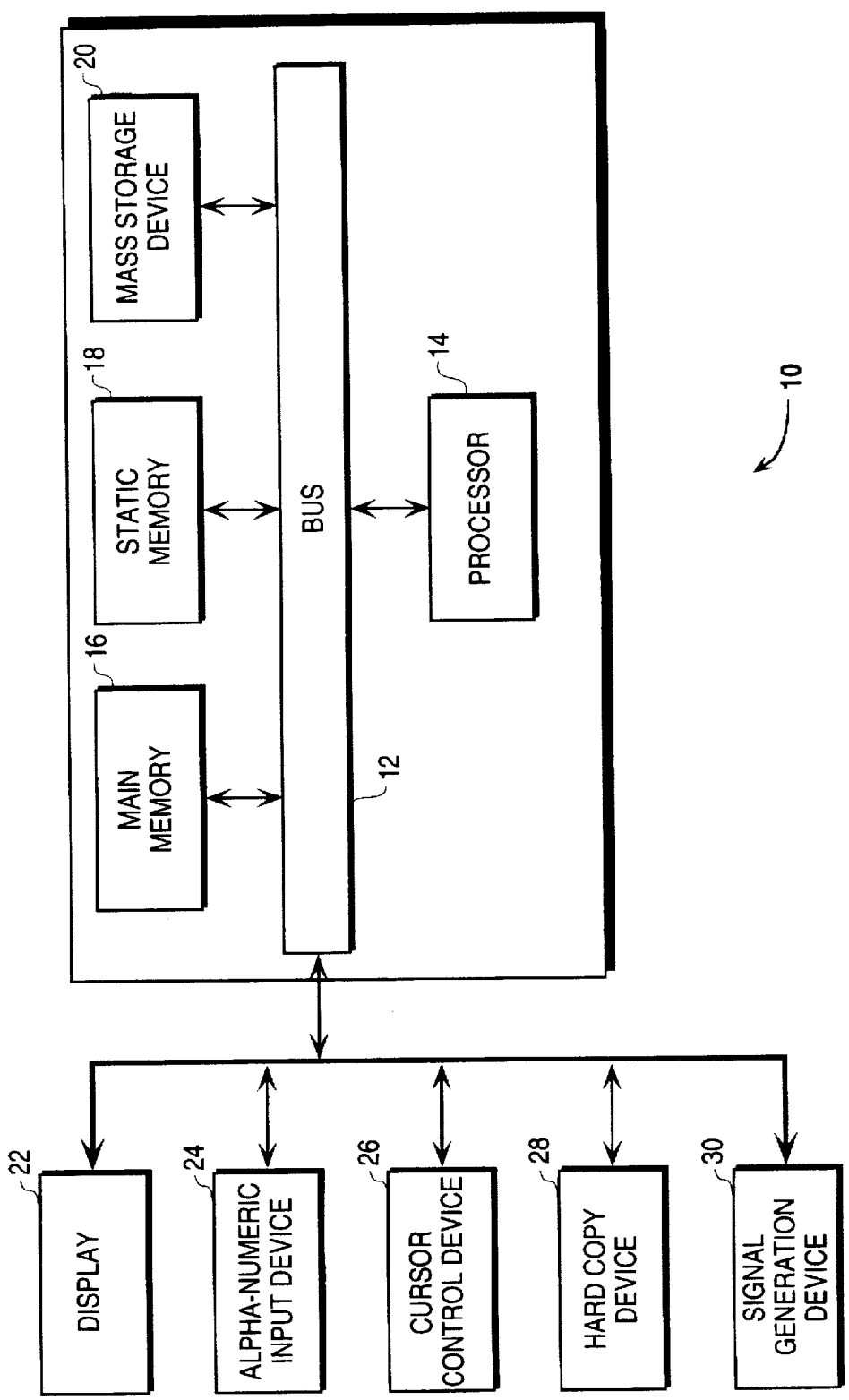
FIG. 1 is a block diagram of a computer system according to the present invention.

A method and apparatus for dynamically adjusting the power consumption of a circuit block within an integrated circuit are described. In the following description, for purposes of explanation, numerous specific details are set forth in order to provide a thorough understanding of the present invention. It will be evident, however, to one skilled in the art that the present invention may be practiced without these specific details.

The present invention is employed in conjunction with a circuit block within an integrated circuit. The circuit block may comprises a functional unit, and the terms "circuit block" and "functional unit" are used interchangeably within this specification. A circuit block is a portion of an integrated circuit, and has a designated functional purpose. Examples of circuit blocks within a microprocessor, such as the Pentium® Processor manufactured by Intel Corporation of Santa Clara, Calif., include a translation lookaside buffer (TLB), an instruction decoder, an instruction fetch circuit, execution units, a memory cache, a branch target buffer (BTB) and a bus controller. Further examples of circuit blocks to which the present invention can be applied would be apparent to a person skilled in the art in light of the following description. The present invention allows a circuit block to be powered down when it is speculatively anticipated that the relevant circuit block will not be required to function in the near future, or to be powered up when it is speculatively anticipated that the relevant circuit block will be required to function in the near future. The present invention proceeds from the following three key observations:

1. The ratio of idle time to operational time of a circuit block is determined by the application currently being executed by the microprocessor. For example, in the situation where a microprocessor is being utilized to execute a word processing application, the floating point unit (FPU) of the microprocessor will experience a high proportion of idle time to active time.
2. In a performance/power consumption trade-off, the significance of a latency period, or time delay, required to power-up a circuit block decreases as the duration of a powered-down period increases. For example, where a circuit block has been powered-down for 50 clock cycles, a 2 clock cycle penalty which may be required to power-up the circuit block becomes less undesirable than in a scenario in which the relevant circuit block has only been powered-down for 5 clock cycles, when considering the power savings that can be achieved.
3. It is possible, by tracking the history of activity within an integrated circuit (IC), to make a prediction as to whether circuit block activity or inactivity is more or less probable in the near future. For example, if a number of consecutive level one cache hits (for example 10) occur, the likelihood that a subsequent memory access will also result in a level one cache hit increases.

The present invention places a circuit block in a powered up or down state by predicting future activity or inactivity of the circuit block. The prediction may be based on historical activity or inactivity within an integrated circuit incorporating the circuit block, or the occurrence of any event (or sequence of events) which provide a speculative indication of future inactivity of the circuit block based on, for example, statistical probabilities. The historical activity or inactivity, or sequence of events, within the integrated circuit on which the speculative prediction is based may vary widely, depending on the function of the circuit block. For example, the activity or inactivity within the integrated circuit could be that of a circuit block other than the circuit block which is placed in the powered down state. Non-limiting examples of activity or inactivity which may provide the historical basis for predicting the inactivity of a number of circuit blocks will be described in further detail below.

In one embodiment, the present invention allows certain circuit blocks to be powered up and down while allowing other circuit blocks to remain powered up by, for example, using a distributed clock system. The distributed clock system provides each circuit block, or a predetermined group of circuit blocks, with an individual clock signal. By turning off the individual clock signal, the relevant circuit block can be powered down. It should furthermore be noted that, while gating a clock signal to a circuit block provides one method of powering down the relevant circuit block, the invention is not limited to this method. For example, it is possible to shut off each circuit block's clock or to perform other powering down operations unique to the circuit block to achieve the power down state. Examples of such further techniques will be discussed below.

Referring to FIG. 1, an overview of a computer system 10, which may be utilized in conjunction with one of the described embodiments of the present invention, is shown in block diagram form. It will be understood that, while FIG. 1 is useful for providing an overall description of a computer system, a number of details of the system are not shown. As necessary for disclosure of the present invention, further detail is set forth with reference to other figures provided with a specification. Further, the present invention is described with reference to its preferred embodiments. Alternative embodiments which may be conceived by one of ordinary skill in the art are considered within the scope of the invention. As illustrated in FIG. 1, the computer system 10 comprises a bus 12 for communicating information, a processor 14, coupled to the bus 12, for processing information, and a main memory 16 which is typically a random access memory (RAM) for storing information and instructions for the processor 14. The main memory 12 is also coupled to the bus 12. A static memory 18, in the form of a read only memory (ROM) or other non-volatile storage device, is coupled to bus 12, and stores non-volatile information and instructions for the processor 14. A mass storage device 20, such as a magnetic disk and associated drive unit, is also coupled to the bus 12 and stores information and instructions for use within the computer system 10. A display unit 22 (such as a cathode ray tube (CRT) or liquid crystal display (LCD)), an alpha-numeric input device 24 (such as a keyboard), a cursor control device 26 (such as a mouse or other pointing device), a hard copy device 28 (such as a printer or plotter for providing visual representations of computer images), and a signal generation device 30 (such as a microphone or loudspeaker) are all coupled to the bus 12, and are thereby coupled to each other and the other components of the computer system 10.

Figure 2:
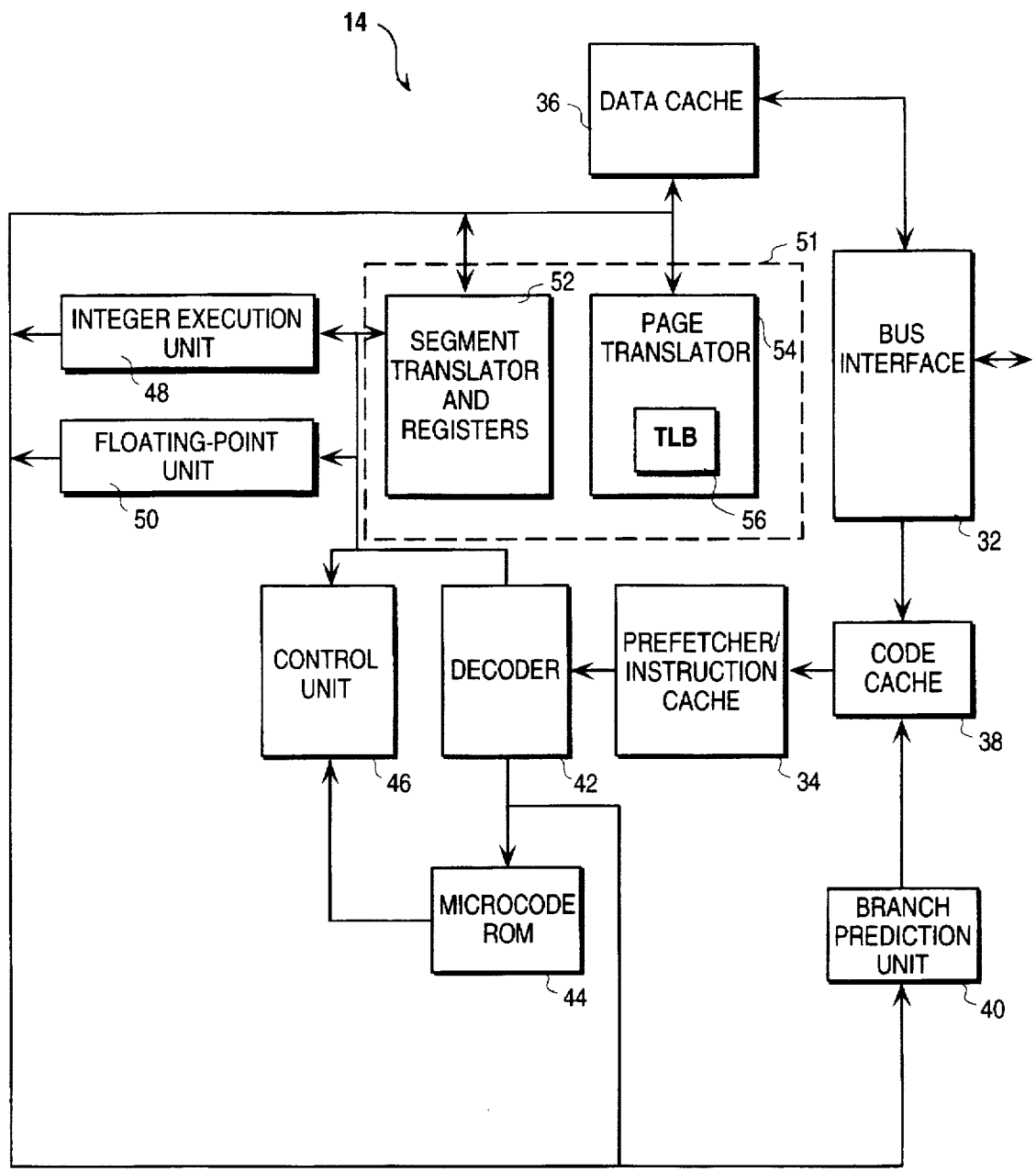
FIG. 2 is a block diagram of a microprocessor according to the present invention.

Referring now to FIG. 2, a more detailed overview of the processor 14 of FIG. 1 is shown in block diagram form. The processor 14 comprises a bus interface unit 32, which provides the interface between the processor 14 and the bus 12 of the computer system 10. The bus interface unit 32 is coupled to allow a pre-fetcher 34 and a data cache 36 to access the main memory 16 of the computer system 10. Coupled between the bus interface unit 32 and the pre-fetcher 34 is a code cache 38. The processor 14 further comprises an instruction decoder 42 coupled to the pre-fetcher 34, for decoding instructions fetched by the pre-fetcher 34. A microcode read only memory (ROM) 44 is coupled to the decoder 42 and receives entry-points from the decoder 42. The microcode ROM 44 supplies microcode instructions to a control unit 46. The control unit 46 supplies an integer pipeline execution unit 48, and a floating-point pipeline execution unit 50 with integer and floating-point instructions, respectively, for execution. The integer pipeline execution unit 48 and the floating-point pipeline execution unit 50 have access to the data cache 36 when executing the instructions. The integer pipeline execution unit 48 and the floating-point pipeline execution unit 50 are furthermore both coupled to a memory management unit 51, which comprises a segment translator 52 and a page translator 54, the page translator 54 incorporating a translation lookaside buffer (TLB) 56.

To perform the requisite functions, the integer pipeline execution unit 48 and the floating-point pipeline execution unit 50 each contain sets of address generation logic, arithmetic logic and cache memory interfaces.

The present invention is applicable to each of the circuit blocks 32–56 described above, as well as to various sub-circuit blocks which may constitute part of any of the circuit blocks illustrated. It will furthermore be appreciated that application of the invention is not limited to the various circuit blocks illustrated in FIG. 2.

Figure 3:
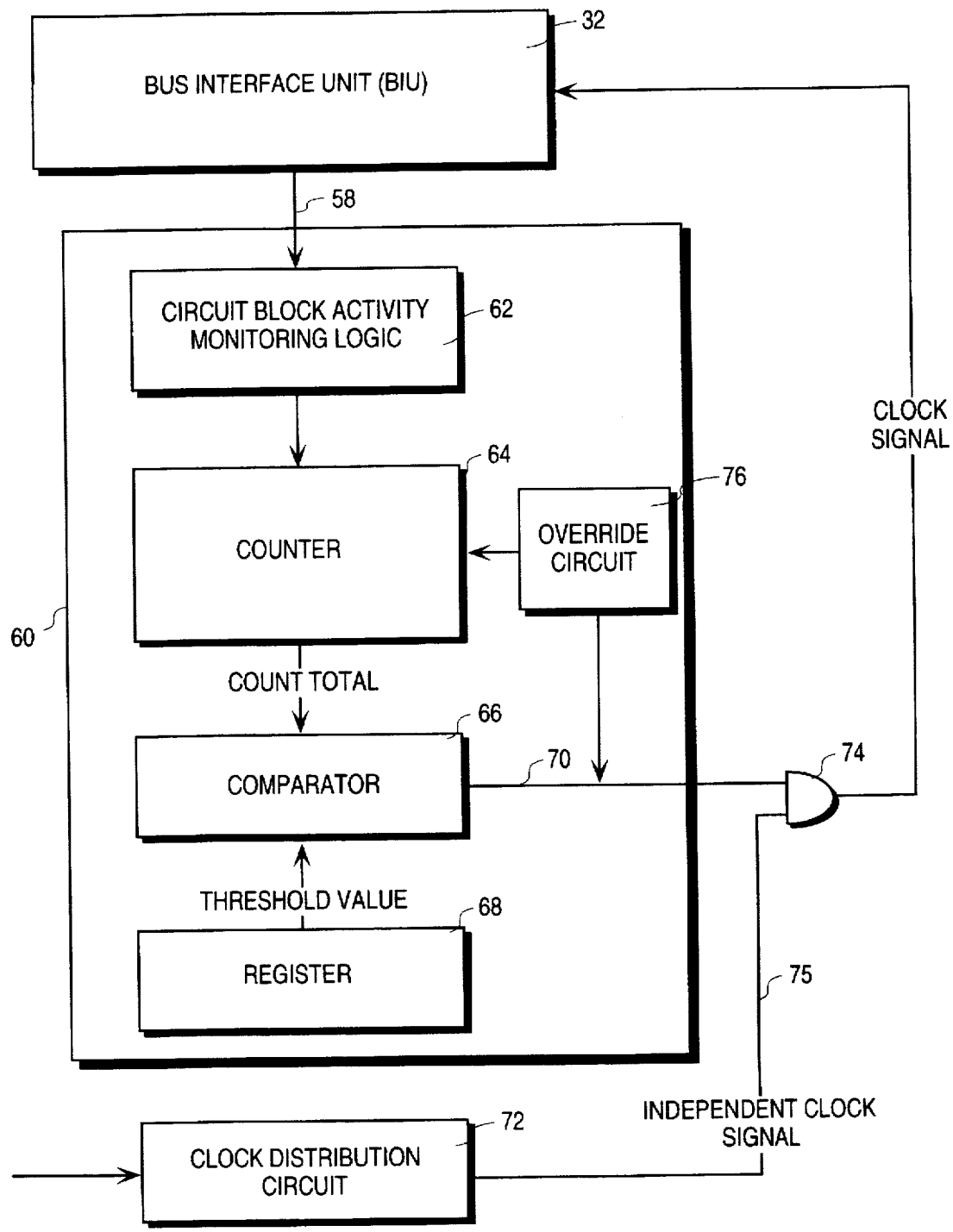
FIG. 3 is a block diagram of a first embodiment of a circuit block and associated power control circuit according to the present invention.

Referring now to FIG. 3, there is shown a block diagram of a first embodiment of the present invention. A circuit block, in the form of the bus interface unit (BIU) 32, is coupled via a bus 58 to a power control circuit 60. The power control circuit 60 comprises circuit block activity monitoring logic 62, which monitors activity of the BIU 32, and provides a first type of output signal for each clock cycle in which the BIU 32 is active, and a second type of output signal for each clock cycle in which the BIU 32 is inactive. For example, the BIU 32 is active when:

1. a memory or input/output (I/O) request is made from the CPU to the computer system;
2. the computer system requests use of a CPU (or host) bus; or
3. the computer system requests the servicing of an interrupt.

The monitoring logic 62 is coupled to a counter 64 which is a saturating, up counter. The counter 64 is incremented upon the receipt of an output signal of the second type from the monitoring logic 64 (e.g. when the monitoring logic 62 detects a clock cycle in which the BIU 56 was inactive or idle), and is reset upon receipt of an output signal of the first type from the monitoring logic 62 (e.g. when the monitoring logic 62 detects a clock cycle in which the BIU 32 was active).

In a modified version of the embodiment shown in FIG. 3, the counter 64 is a saturating, up/down counter, which is incremented on receipt of a trigger signal of the first type from the monitoring logic 62, and decremented on receipt of a trigger signal of the second type from the monitoring logic 62. The functioning of this modified version is described in more detail below with reference to FIG. 6.

As stated above, the counter 64 is a saturating, up counter, the upper limit of a count performed by the counter 64 being determined by the number of bits used in the counter 64. For example, a 4-bit counter will count from 0 to 15, and will saturate at 15 if counting upwards, and at zero if counting downwards. The width of the counter (i.e. the number of bits used within the counter) can be selected based arbitrarily on different factors, and will be dependent on the function of the circuit block with which the power control 60 is associated.

The counter 64 is coupled to a comparator 66, which compares a count total value supplied by the counter 64 to a threshold value stored in a register 68. On detecting a correlation between the count total value, and the threshold value, the comparator 66 issues a clock disable signal, by de-asserting line 70. Clock distribution circuit 72 provides the BIU 32 with an independent clock signal. In one embodiment of the invention, a number of circuit blocks within the integrated circuit are provided with independent clock signals. This can be achieved by driving multiple internal clock generators, each with its own independent clock control, derived from a single input, which is the primary CPU clock input. The independent clock signal 75 from the clock distribution circuit 72, and the enable/disable signal 70 from the comparator 66 comprise the inputs for an AND gate 74, thereby allowing the comparator 66 to gate the independent clock signal 75 to the BIU 32 by deasserting line 70. The output of the AND gate 74 is coupled to provide the clock signal for the BIU 32. An override circuit 76 is also coupled to line 70, and is configured to drive this line high when it is determined that BIU 32 activity is again required after a period in which the clock signal to the BIU 32 has been gated. The override circuit 76 provides the capability to again enable the independent clock signal to the BIU 32 with a reduced time penalty, and may be coupled to receive inputs from any number of circuit blocks within the integrated circuit. The override circuit 76 performs the following three primary functions:

1. the activation of the BTU 32 when it is again needed, by driving the line 70 high.
2. the monitoring of activity of other circuit blocks (for example by active polling or the monitoring of outputs from such other circuit blocks) to thereby obtain some indication that the BIU 32 may be needed it the near future. This allows the override circuit 76 to minimize the performance penalty that may be experienced when the BIU 32 is powered-up.
3. the provision of a graceful recovery procedure when a speculative prediction regarding future inactivity of the BIU 32 proves to be incorrect.

The graceful recovery procedure is executed by a graceful recovery mechanism or circuit (not shown) which may be incorporated within the override circuit 76. The graceful recovery mechanism operates to ensure that, when activation of the BIU 32 is unexpectedly required after it has been powered-down, no functional errors occur. For example, an interrupt request, targeted at the CPU and originating from a device within the computer system, may unexpectedly arrive at the BIU 32. As the BIU 32 is powered-down, there may be delay before the BIU 32 is able to receive the interrupt request. In this case, the graceful recovery mechanism may initiate a handshake protocol with the device from which the interrupt request originated in order to prevent functional errors.

The override circuit 76 may also include a register, storing a second threshold value, and a comparator, so as to enable the override circuit 76 to enable the independent clock signal to the BIU 32 after it has been deactivated for a predetermined number of clock cycles. The second threshold value may be statistically determined.

Figure 4:
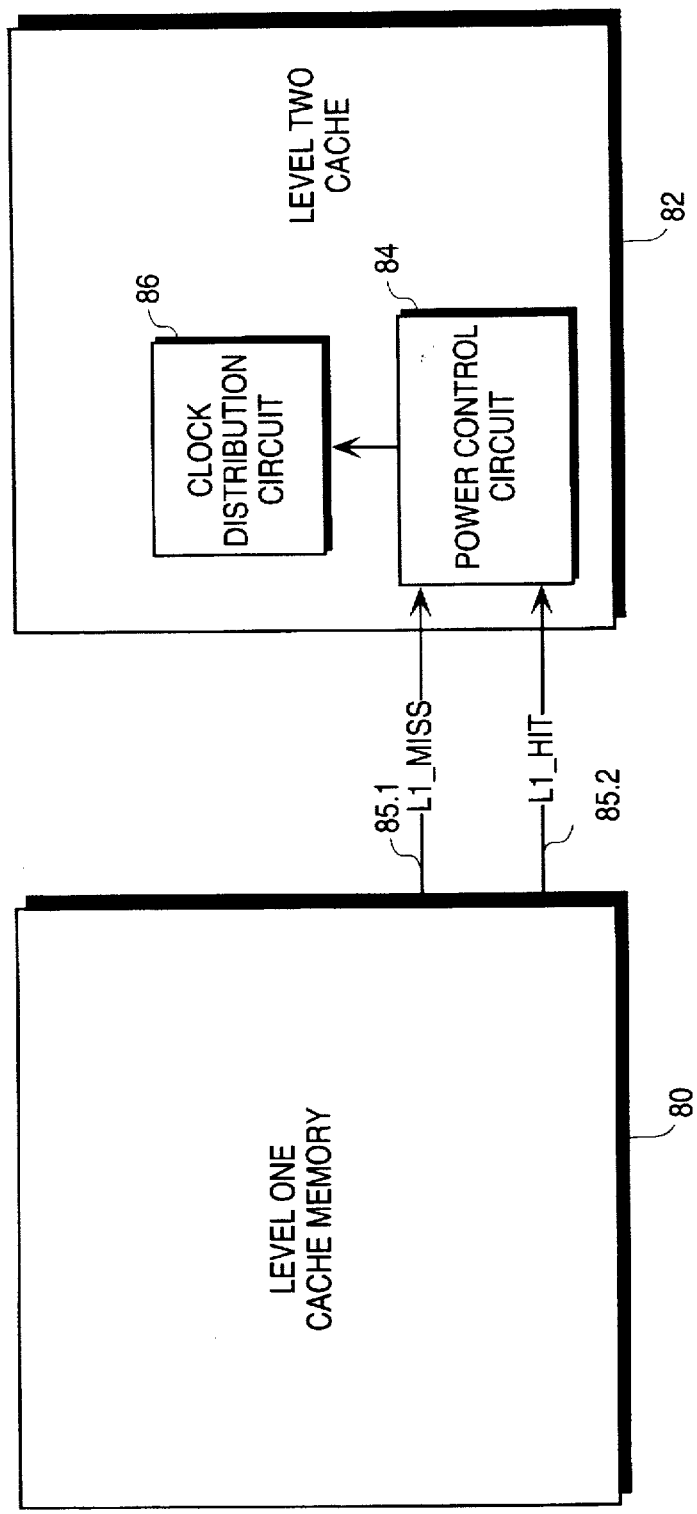
FIG. 4 is a block diagram of a second embodiment of a circuit block and associated power control circuit according to the present invention.

While the power control circuit 60 and the clock distribution circuitry 72 are shown in FIG. 3 to be located externally of the BIU 32, it will be appreciated that the circuits 60 and 72 could readily be incorporated within the BIU 56, and need not be located externally thereof. An example of such an implementation is reflected in a second embodiment of the invention shown in FIG. 4. FIG. 4 shows, in block diagram form, a hierarchical cache memory arrangement, and depicts a level one (L1) cache memory 80 and a level two (L2) cache memory 82. The L2 cache memory 82 incorporates a power control circuit 84 and a clock distribution circuit 86. The level one cache memory 80 is coupled to provide two inputs to the power control circuit 84, namely an L1_MISS input 85.1, which is asserted when a level one cache memory miss occurs, and an L1_HIT input 85.2, which is asserted when a level one cache memory hit occurs. The power control circuitry 84, which includes a counter, a comparator and at least one register as described above with reference to FIG. 3, is thus able, in a first implementation, to maintain a count of the number of consecutive level one cache memory hits by incrementing the counter when the L1_HIT input 85.2 is asserted and by resetting the counter when the L1_MISS input 85.1 is asserted. In a second implementation of the embodiment shown in FIG. 4, the counter is an up/down counter, and is incremented when the L1_HIT input 85.2 is asserted, and decremented when the L1_MISS input 85.1 is asserted, thus maintaining a count of the difference between the number of level one cache memory hits and misses that occur over a pre-determined period. In one embodiment, the power control circuit 84 includes two registers, storing first and second threshold values. The power control circuit 84 is arranged to power down the L2 cache memory 82 when a number of L1 cache memory 80 hits corresponding to the first threshold have occurred, and then power up the L2 cache memory 82 when a number of L1 cache memory 80 hits corresponding to the second threshold have occurred. The power control circuit may also include logic (not shown) for modifying the first and second threshold values by performing an on-going statistical analysis of L1-HIT and L1-MISS occurrences.

The power control circuit 84 includes a graceful recovery mechanism (not shown) for preventing functional errors when an unexpected L2 cache memory 82 access is required after the L2 cache memory 82 has been powered down. More specifically, after the L2 cache memory 82 has been powered down, a L1 cache memory 80 miss may unexpectedly occur, and a L2 cache memory access will be requested. In this case, a L2 cache controller (not shown) must stall the access until the L2 cache memory 82 can be powered-up. This requires that the graceful recovery mechanism initiate a handshaking protocol with the device from which the access request originated to indicate when data from the L2 cache memory 82 becomes available. This may involve issuing a "busy" signal to the requesting device to prevent additional L2 cache memory access requests being generated by the requesting device until the L2 cache memory 82 has powered up and serviced the pending request. From the perspective of the requesting device (for example the L1 cache memory 80), the access request is serviced correctly, but with a slightly longer latency than a conventional L2 cache memory access.

The power control circuit 84 is coupled to the clock distribution circuit 86 and, in a manner similar to that described in FIG. 3, is able to enable and disable an independent clock signal to the L2 cache memory 82, and thus to power up and power down the L2 cache memory 82.

Figure 5:
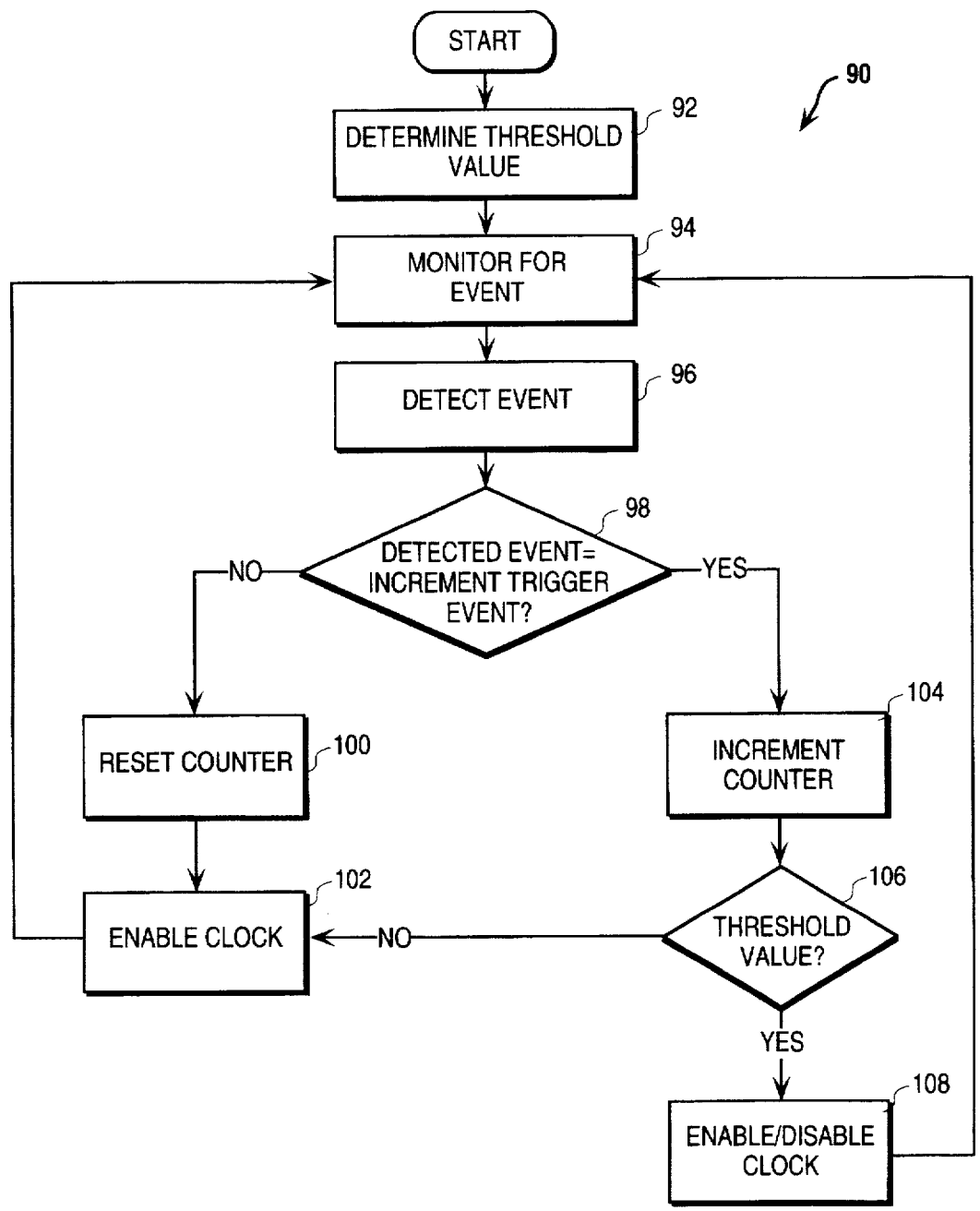
FIG. 5 is a flow chart illustrating a first method of reducing the power consumption of a circuit block according to the invention.

The methodology of the present invention will now be described with reference to FIGS. 5 and 6. Turning firstly to FIG. 5, there is shown a flow chart illustrating a first method 90 of dynamically adjusting the power consumption of a circuit block within a microprocessor. The method comprises the step 92 of determining a threshold value which, in the embodiment shown in FIG. 3, is loaded into the register 68. The threshold value could be hard-wired within a power control circuit, or could alternatively be loaded into the register 68 from the main memory 16 or static memory 18. The threshold value may be varied according to the type of application being executed by the computer system, and by the desired performance/power consumption tradeoff characteristic. For example, when a word processing application is being executed by the processor 14, a threshold value for the floating-point unit (FPU) 50 within the processor 14 may be set to a low-value, so that the FPU 50 is powered up or down after only a few trigger events. The threshold value is significant, in that it determines the power savings and performance characteristics of an integrated circuit, as will be more fully described below. In one embodiment, the threshold event is statistically determined to provide an optimum performance/power consumption characteristic for a particular application. At step 94, the methodology requires the continual monitoring of the integrated circuit for a predetermined trigger event, or number of events. The trigger events monitored at step 94 are dependent on the function of the circuit block for which the methodology is being implemented. For example, the trigger event could simply be a clock cycle for which a circuit block is inactive or active as described above with reference to FIG. 3. Alternatively, the trigger event could be a L1 cache memory hit or miss as described above with reference to FIG. 4. At step 96, an event is detected, and at step 98, it is determined whether the detected event is an event of the type which requires the counter of a power control circuit to be incremented. Examples of events which will trigger a counter increment are a clock cycle in which the circuit being monitored is inactive, as described in reference to FIG. 3, or a L1 cache memory hit, as described with reference to FIG. 4. If the event is determined not to require a counter increment, the methodology proceeds to step 100, wherein the counter is reset. This in turn results in the comparator 66 continuing to assert a clock enable signal at step 102. The methodology then returns to step 94, to monitor for the occurrence of subsequent event.

On the other hand, should the event be determined at step 98 to require a counter increment, the methodology proceeds to step 104, at which the counter is incremented. At step 106, the comparator determines whether the count total, as outputted by the counter, has reached the threshold value determined at step 92. If not, the methodology then proceeds to step 102 as described above. However, if the comparator determines that the count total is equal to or greater than the threshold value, the comparator then outputs a clock disable signal indicated at step 108, which has the effect of enabling or disabling the independent clock signal to the circuit block being monitored.

While the above discussion of the methodology of FIG. 5 describes monitoring active and inactive clock cycles of a circuit block, it will be appreciated by those skilled in the art that the events monitored need not be circuit block activity, but could be any other activity or event within the integrated circuit which will provide some indication of future activity or inactivity of the relevant circuit block by reason of a predicted proximity of the monitored event to a future period which will not require activity of the relevant circuit block. For example, with reference to FIG. 4, by monitoring L1 cache memory hits, a power control circuit is speculatively able to predict whether a future memory access will likely result in a L1 cache memory hit or miss. In a further embodiment, activity or inactivity, involving circuit block A is monitored to provide a speculative indication of when to power down circuit block C, and activity or inactivity involving circuit block B is monitored to provide a speculative indication of when to power up circuit block C.

Figure 6:
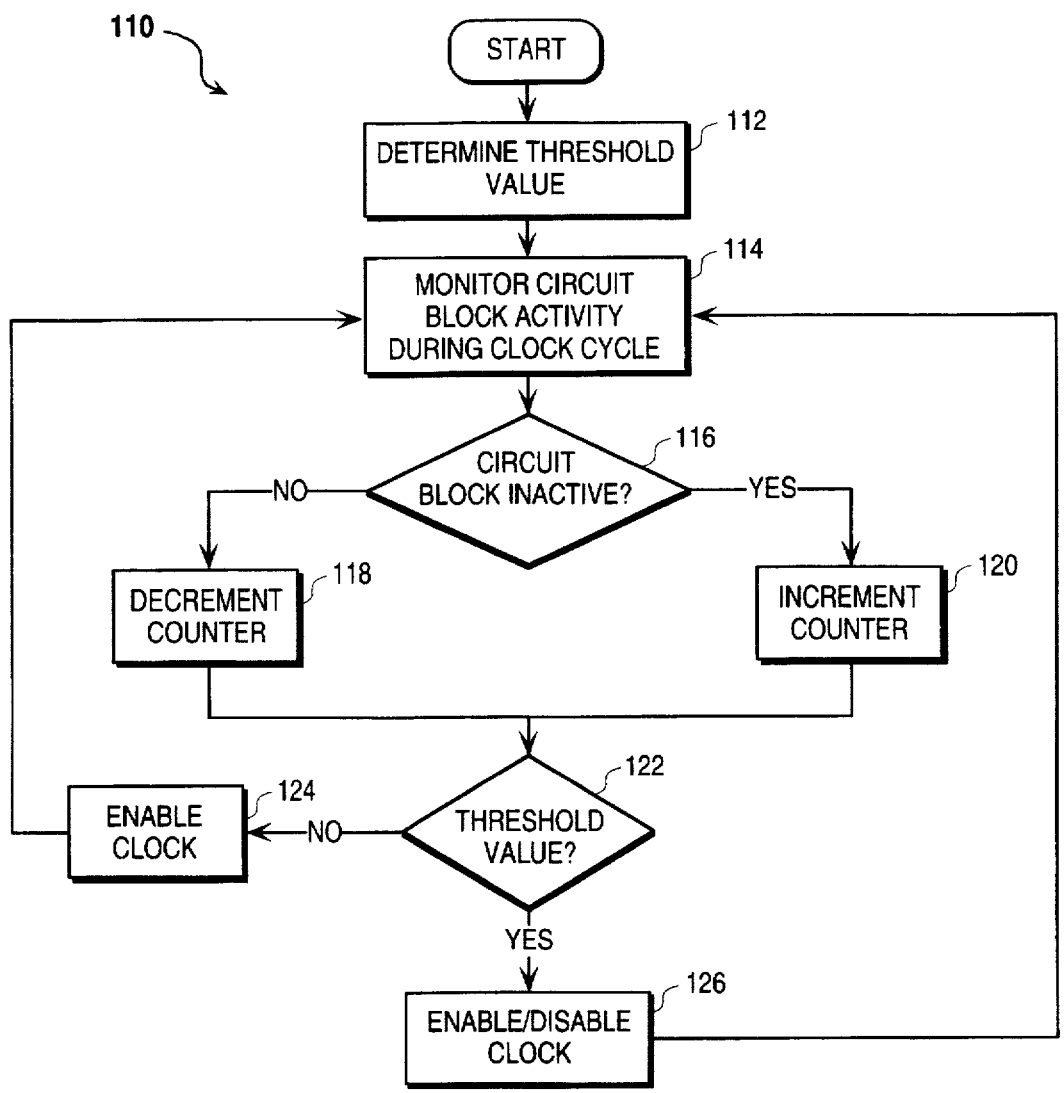
FIG. 6 is a flow chart showing a second method of reducing power consumption of a circuit block according to the invention.

Referring now to FIG. 6, a second method 110 of dynamically adjusting the power consumption of a circuit block within a microprocessor is depicted. The method 110 is a modification of the method 90 discussed in FIG. 5, and comprises the steps of determining a threshold value at step 112, monitoring a circuit block, such as the BIU 32, for activity during a clock cycle at step 114. At step 116, a determination is made as to whether the circuit block was active or inactive during the monitored clock cycle. In the event that the circuit block was active, a counter is decremented at step 118. Alternatively, should the monitored circuit block have been inactive, the counter is incremented at step 120. The count total of the counter is then compared by a comparator to the determined threshold value at step 122, to determine whether the count total is equal to or greater than the threshold value. In the event that the count total is less than a threshold value, the method proceeds to step 124, wherein the comparator outputs an enable signal. Alternatively, should the count total equal or exceed the threshold value, the method proceeds to step 126, wherein the comparator outputs a clock disable signal.

While the above discussions have related primarily to gating a dedicated clock signal as a method of reducing power consumption within a circuit block, it will be appreciated by those skilled in the art that any one of a number of alternative measures could be implemented to achieve a power savings within the relevant circuit block. For example, the frequency of the clock signal to the circuit block could be reduced. Alternatively, the operating supply voltage could be removed from the circuit block, or input and output signals (other than the clock signal) from the circuit block could be prevented from transitioning (or toggling). In another embodiment, the output load of the circuit block could be decoupled to achieve a reduction in power consumption.

Figure 7:
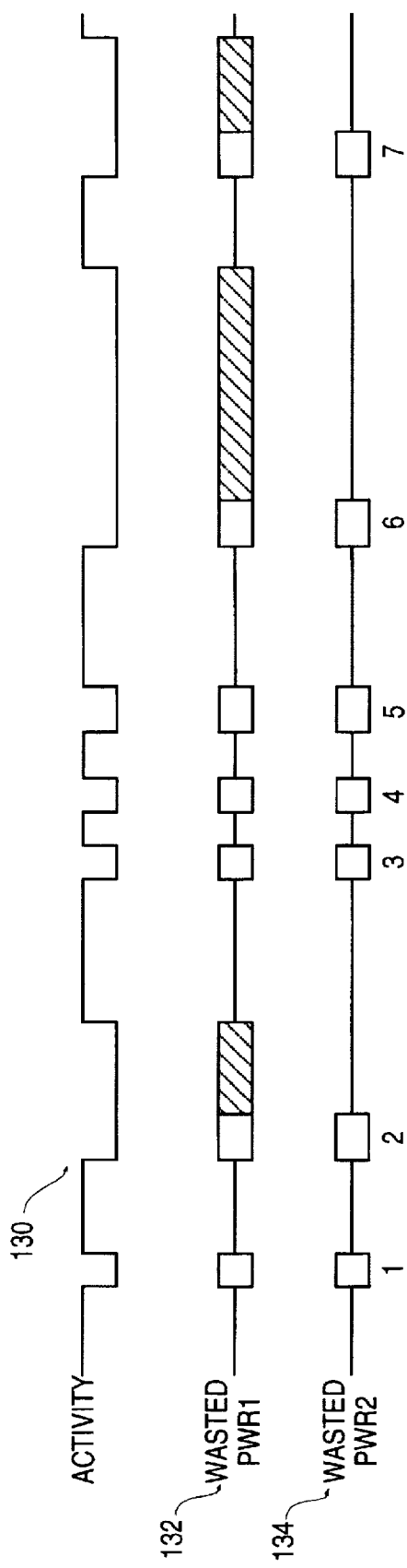
FIG. 7 is a circuit activity diagram, illustrating reduced power consumption achieved according to the present invention.

FIG. 7 illustrates circuit block (or "functional unit") activity and inactivity over a continuous period of time. Activity line 130 shows circuit block activity when high, and circuit block inactivity when low. FIG. 7 also illustrates wasted power consumption, (due exclusively to clock activity) in two scenarios at power consumption lines 132 and 134 respectively. Line 132 shows wasted power consumption within the circuit block when the circuit block is idle, for a circuit block to which the present invention has not been applied. Line 134 shows wasted power consumption of a circuit block to which the present invention has been applied.

To provide the illustration of power savings that can be achieved by the present invention, an illustrative calculation is given below. The calculation requires three assumptions, namely:

1. the penalty for restarting a unit clock is one cycle (arbitrarily chosen);
2. on average, 50% of the total power consumed by the circuit block is due to toggling of the clock signal; and
3. the present invention stops the clock signal to the circuit block after a threshold idle period of 40 clock cycles (arbitrarily chosen).

In the activity profile example illustrated in FIG. 7, the unit is only doing useful work for 50% of the shown period (i.e. 500 clock cycles out of the 1,000 clock cycles shown.) Accordingly, 50% of the total power consumed by the circuit block is wasted as shown by line 132. As stated above, for a circuit block showing an activity profile as illustrated at line 130, and requiring a penalty of one clock unit for restarting the clock, prior art clock gating mechanisms would not be used in view of the inability to determine with absolute certainty future activity of the circuit block, after an idle period, with sufficient lead time. According to the teachings of the present invention, as applied in the present example, the clock is stopped after an idle period of 40 clock cycles, as shown at points (2), (6) and (7) on line 134. As the circuit block was idle for a period of less than 40 clock cycles at points (1), (3), (4) and (5), the clock was not stopped during these idle periods. By employing the present invention, the wasted power indicated in cross-hatch on line 132 can be saved. This power saving is achieved while incurring only a three clock penalty, and accordingly the invention provides a favorable performance loss/power savings trade-off. It will furthermore be appreciated that the power/performance characteristics of the circuit block can be varied by varying the idle period after which the clock signal to the circuit block is stopped.

Assuming that, in the activity profile illustrated in FIG. 7, the circuit block was only powered-up for 240 unnecessary clock cycles (as shown at line 134), the power savings achieved by the invention can be calculated as follows:

Wasted Power Consumption during idle periods. =

$$\left( \left[ \frac{240}{1,000} \right] + \left[ 0.5 \left( \frac{260}{1,000} \right) \right] \right) \times (\text{Total Power Consumption}) =$$

$$0.37 \times (\text{Total Power Consumption})$$

Bearing in mind that 50% of total power consumption is wasted in the scenario depicted at line 132, it is thus clear that a 13% power savings within the circuit block can be achieved utilizing the present invention.

The performance penalty in the scenario illustrated at line 134 is furthermore only 3 clock cycles, which represents a decline in circuit performance of a mere 0.6%.

The above discussions, merely for the purposes of illustration, have also focused on achieving power savings within a bus interface unit, or a hierarchical cache memory system. The above described apparatus and methodology of adjusting power consumption could be applied to any one of a number of circuit blocks, such as those discussed with reference to FIG. 2, implemented on a single chip die. The apparatus and methodology of the present invention could be applied to:

1. an execution unit, where a speculative prediction of future inactivity of the execution unit is based on the prior history of execution of instruction types particular to the execution unit;
2. a page walk handler, where a speculative prediction of future inactivity of the page walk handler is based on translation lookaside buffer hits;
3. a microinstruction generation unit, where a speculative prediction of future inactivity of the unit is based on the recent history of complex instructions;
4. an instruction decoder that decodes a specific instruction type, where a speculative prediction of future inactivity of the decoder is based on the recent history of the occurrence of the specific instruction type;
5. a bus controller, where a speculative prediction of future inactivity of the bus controller is based on recent bus access frequency;
6. a branch target buffer, where a speculative prediction of future inactivity of the buffer is based on the recent history of branch instruction occurrences;
7. a branch address calculator, where a speculative prediction of future inactivity of the calculator is based on the recent history of branch instruction occurrences; and
8. a streaming buffer, where a speculative prediction of future inactivity of the buffer is based on time elapsed since a previous demand fetch.

The above-described methodology and apparatus of the present invention is particularly advantageous in that it allows power savings to be achieved within an integrated circuit, such as a microprocessor, by powering down circuit blocks which have traditionally not been powered down in view of the absence of a method or apparatus for speculatively predicting future activity or inactivity of a circuit block. The present invention proposes a method of adjusting the power consumption of the circuit blocks based on a speculative prediction of future circuit block inactivity, the prediction being based on the monitored activity history of the circuit block itself or other circuit blocks within the integrated circuit. Further, by providing sufficient granularity and resolution so as to allow individual circuit blocks within an integrated circuit to be powered down independently of other circuit blocks, the present invention also provides a significant advantage over the prior art.

Thus, a method and apparatus for dynamically adjusting the power consumption of a circuit block within an integrated circuit have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of dynamically adjusting the power consumption of a circuit block within an integrated circuit, the method comprising the steps of:
   (a) incrementing a count total maintained by a counter on the occurrence of a first type of trigger event, and detecting the occurrence of a predetermined event when the count total maintained by the counter equals, or transcends, a predetermined threshold value, the predetermined event providing a speculative indication of a future state of activity of the circuit block by reason of a predicted proximity of the predetermined event to the future state of activity of the circuit block; and
   (b) adjusting the power consumption of the circuit block in response to the occurrence of the predetermined event.

2. The method of claim 1 wherein the first type of trigger event is a clock cycle for which the circuit block is inactive.

3. The method of claim 1 wherein the circuit block is a level two cache memory and the first type of trigger event is a level one cache memory hit.

4. The method of claim 1 wherein the circuit block is a page walk handler and the first type of trigger event is a translation lookaside buffer hit.

5. The method of claim 1 wherein the circuit block is a bus interface unit coupled to a bus, and the first type of trigger event is a bus access.

6. The method of claim 1 wherein step (a) includes the step of resetting the count total maintained by the counter to a base value on the occurrence of a second type of trigger event.

7. The method of claim 6 wherein the second type of trigger event is a clock cycle for which the circuit block is active.

8. The method of claim 1 including the step of
   decrementing the count total maintained by the counter on the occurrence of a second type of trigger event.

9. The method of claim 1 wherein the circuit block is clocked by an associated independent clock, and step (b) comprises the step of stopping the independent clock associated with the circuit block.

10. The method of claim 1 wherein the circuit block is clocked by a clock signal, and step (b) comprises the step of gating the clock signal.

11. The method of claim 1 wherein the predetermined event provides a speculative indication of future inactivity of the circuit block, and the power consumption of the circuit block is reduced in response to the occurrence of the predetermined event.

12. The method of claim 1 wherein the predetermined event provides a speculative indication of future activity of the circuit block, and the power consumption of the circuit block is increased in response to the occurrence of the predetermined event.

13. Apparatus for dynamically adjusting the power consumption of a circuit block within an integrated circuit, the apparatus comprising:
   a counter to maintain a count of a first type of trigger event;
   detection circuitry to detect the occurrence of a predetermined event by detecting when the count of the first type of trigger events maintained by the counter equals, or transcends, a predetermined threshold value, the predetermined event providing a speculative indication of a future state of activity of the circuit block by reason of a predicted proximity of the predetermined event to the future state of activity of the circuit block; and
   adjustment circuitry, coupled to the detection circuitry, to adjust the power consumption of the circuit block in response to the occurrence of the predetermined event.

14. The apparatus of claim 13 wherein the counter is to maintain a count of cycles for which the circuit block is inactive.

15. The apparatus of claim 13 wherein the circuit block is a level two cache memory, and wherein the counter is to maintain a count of level one cache memory hits.

16. The apparatus of claim 13 wherein the circuit block is a page walk handler, and wherein the counter is to maintain a count of translation lookaside buffer hits.

17. The apparatus of claim 13 wherein the circuit block is a bus interface unit coupled to a bus, and wherein the counter is to maintain a count of bus accesses.

18. The apparatus of claim 13 wherein:
   the counter comprises an up/down counter to maintain a count value indicating the difference between a first type of trigger event, and a second type of trigger event; and
   the detection circuitry is coupled to detect the occurrence of the predetermined event by detecting when the count value indicating the difference between the first type of trigger event and the second type of trigger event is equal to, or transcends, a predetermined threshold value.

19. The apparatus of claim 18 wherein the first type of trigger event is a clock cycle for which the circuit block is inactive, and the second type of trigger event is a clock cycle for which the circuit block is active.

20. The apparatus of claim 13 wherein the circuit block is clocked by an associated independent clock, and the adjustment circuitry comprises circuitry to stop the associated independent clock.

21. The apparatus of claim 13 wherein the circuit block is clocked by a clock signal, and the adjustment circuitry comprises circuitry to gate the clock signal.

22. A processor for a computer system, the processor comprising:
   a circuit block;
   a counter to maintain a count of trigger events;
   a detection circuit to detect the occurrence of a predetermined event by detecting when the count of trigger events maintained by the counter is equal to, or transcends, a predetermined threshold value, the predetermined event providing a speculative indication of a future state of activity of the circuit block by reason of a predicted proximity of the predetermined event to the future state of activity of the circuit block; and
   an adjustment circuit, coupled to the detection circuitry to adjust the power consumption of the circuit block in response to the occurrence of the predetermined event.

23. The processor of claim 22 wherein the counter is to maintain a count of cycles for which the circuit block is inactive.

24. The processor of claim 22 wherein:
   the counter comprises an up/down counter to maintain a count indicating the difference between a first type of trigger event, and a second type of trigger event; and
   the detection circuit is coupled to detect the occurrence of the predetermined event by detecting when the count value indicating the difference between the first type of trigger event and the second type of trigger event equals, or transcends, a predetermined threshold value.

25. The processor of claim 24 wherein the first type of trigger event is a clock cycle for which the circuit block is inactive, and the second type of trigger event is a clock cycle for which the circuit block is active.

26. The processor of claim 22 including an independent clock associated with the circuit block and adapted to generate a clock signal, and wherein the circuit block is clocked by the associated independent clock, and the adjustment circuit comprises circuitry to stop the associated independent clock.

27. The processor of claim 22 wherein the adjustment circuit comprises a circuit configured to gate a clock signal to the circuit block in response to the occurrence of the predetermined event.

28. A method of dynamically reducing the power consumption of a circuit block within an integrated circuit, the circuit block being clocked by a clock signal, the method comprising the steps of:

incrementing a count total value if the circuit block is inactive during a monitored clock cycle;

detecting a threshold event, the threshold event occurring when the count total value is equal to, or transcends, a predetermined threshold value, the threshold event providing a speculative indication of future inactivity of the circuit block by reason of a predicted proximity of the threshold event to a future event which does not require activity by the circuit block; and reducing the power consumption of the circuit block in response to the occurrence of the threshold event.

29. A mechanism for dynamically reducing the power consumption of a circuit block within an integrated circuit, the circuit block being clocked by a clock signal, the mechanism comprising:

an activity monitoring circuit configured to monitor the circuit block over a monitored clock cycle to determine whether the circuit block is active or inactive during the monitored clock cycle, and to generate an increment signal on the determination that the circuit block was inactive during the monitored clock cycle;

a counter, coupled to receive the increment signal from the monitoring circuit, and configured to increment a count total value maintained by the counter on reception of the increment signal;

a register storing a threshold value; and a comparator, coupled to receive the count total value from the counter and the threshold value from the register, and being adapted to compare the count total value to the threshold value, and to output a clock disable signal, for disabling the clock signal, when the count total value is determined to be equal to, or to transcend, the threshold value.

* * * * *